US 6,707,435 B1

(12) United States Patent
Merlato et al.

(10) Patent No.: US 6,707,435 B1
(45) Date of Patent: Mar. 16, 2004

(54) OPTICAL SIGNALING OR DISPLAY DEVICE

(75) Inventors: Sandro Merlato, Winterthur (CH); Albert Frei, Wiesendangen (CH)

(73) Assignee: IMS Industrial Micro Systems AG (CH)

( * ) Notice: Subject to any disclaimer, the term of this patent is extended or adjusted under 35 U.S.C. 154(b) by 0 days.

(21) Appl. No.: 09/601,387

(22) PCT Filed: Feb. 1, 1999

(86) PCT No.: PCT/CH99/00042

§ 371 (c)(1),
(2), (4) Date: Jul. 28, 2000

(87) PCT Pub. No.: WO99/40459

PCT Pub. Date: Aug. 12, 1999

(30) Foreign Application Priority Data

Feb. 4, 1998  (EP) ............................................ 98810082

(51) Int. Cl.$^7$ ................................................ G09G 3/14
(52) U.S. Cl. .............................. 345/39; 345/32; 345/36; 345/42
(58) Field of Search .............................. 345/32, 30, 36, 345/39, 42, 46, 48; 340/907, 906; 362/244, 245

(56) References Cited

U.S. PATENT DOCUMENTS

| 5,546,496 A | * 8/1996 | Kimoto et al. .............. 385/146 |
| 5,633,629 A | * 5/1997 | Hochstein .................... 340/907 |
| 5,833,355 A | * 11/1998 | You et al. .................... 362/244 |
| 5,850,126 A | * 12/1998 | Kanbar ........................ 315/200 |
| 6,244,727 B1 | * 6/2001 | Ryan, Jr. et al. ............. 362/244 |

FOREIGN PATENT DOCUMENTS

| DE | 31 48 243 | 6/1983 |
| DE | 35 00 728 | 7/1986 |
| EP | 0 172 454 | 2/1986 |
| EP | 0 726 554 | 8/1996 |
| WO | 96/24802 | 8/1996 |
| WO | 97/26483 | 7/1997 |

* cited by examiner

Primary Examiner—Chanh Nguyen
Assistant Examiner—Fritz Alphonse
(74) Attorney, Agent, or Firm—Bachman & LaPointe, P.C.

(57) ABSTRACT

A process for monitoring the light intensity of an optical signaling or display device which has a plurality of light sources arranged on the front of a printed circuit board in a rasterized luminous field (F) and a diffusion lens arranged in the main light emission direction of the light sources or a light-collecting intermediate lens and a diffusion lens arranged in sequence, characterized by the process steps of using an at least partly transparent printed circuit board for arrangement of the light sources, arranging of sensors to detect light on the rear of this circuit board, detecting the light beams emitted rearwards towards the printed circuit board by the light sources and/or detection of the light beams reflected at the intermediate lens or, if this is omitted, at the diffusion lens and passing through the printed circuit board, conversing the detected light beams into signals which are passed to an electronic system, and initiating an action such as increasing the electrical power, advance warning and/or disconnection by the electronics system when the signal values fall by a predefined threshold value.

12 Claims, 5 Drawing Sheets

Figures 1, 2:
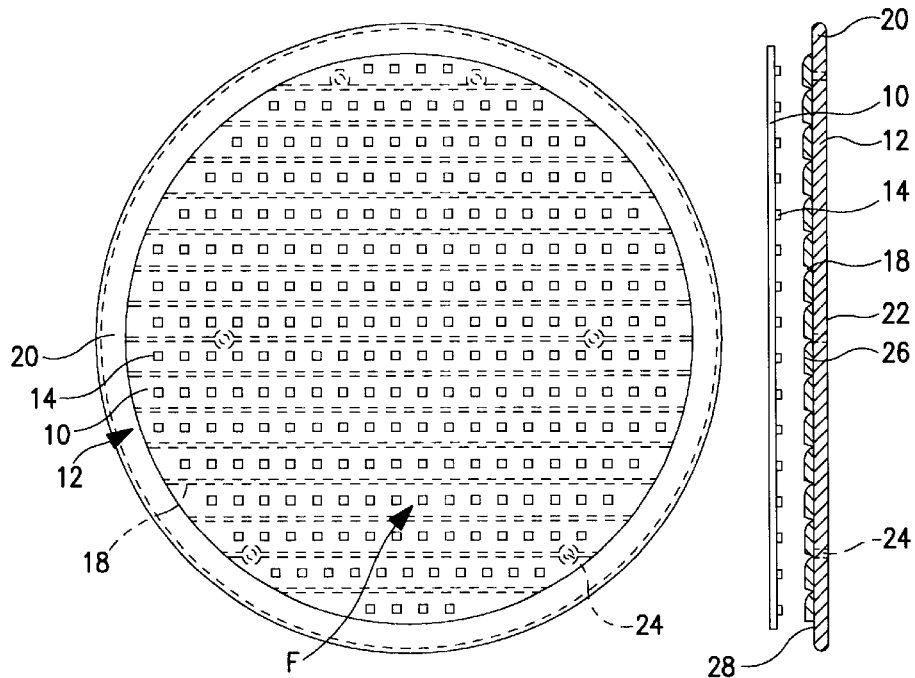

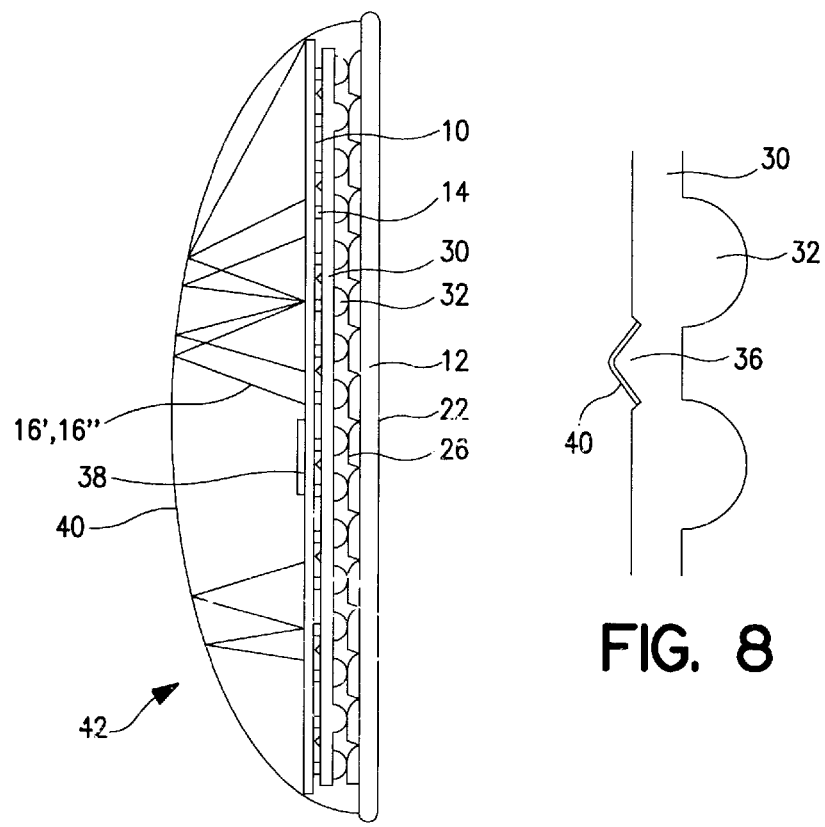
FIG. 8
FIG. 9
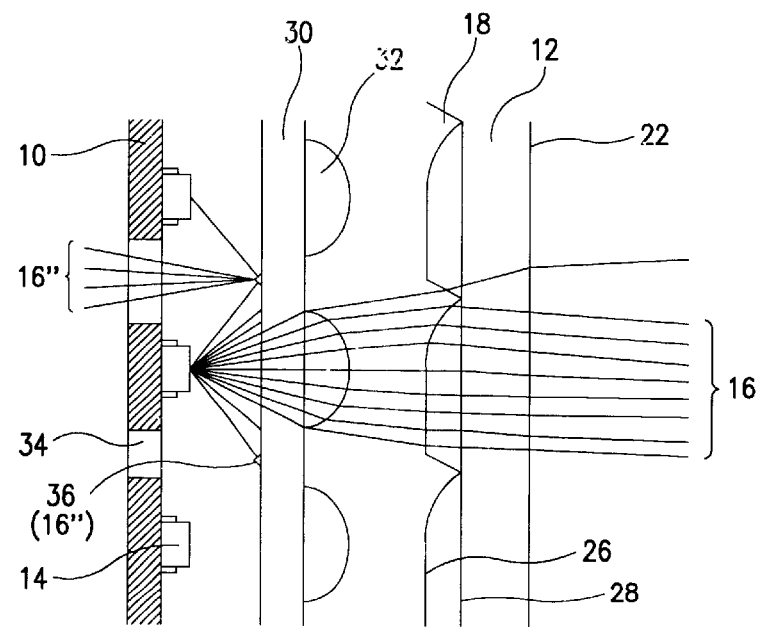
FIG. 7

OPTICAL SIGNALING OR DISPLAY DEVICE

The invention relates to an optical signalling or display device with a rasterized luminous field of a spatially defined light intensity distribution, which device with a housing comprises a matrix arranged on a printed circuit board of light sources, in particular LEDs, which can be controlled individually, in groups or as a whole, and a diffusion lens which is flat on the outside and extends over the entire luminous field, on the inside of which are formed parallel grooves with at least partly asymmetrically curved surface. A lens system comprises at least one lens. The invention further relates to a process for monitoring the light intensity of an optical signalling or display device of the generic type.

In particular, in the case of traffic signals, known rasterized luminous fields comprise high-intensity luminous points which—determined by the raster in relation to resolution—signal all prohibitions, dangers and information at high intensity in a stationary or moving fashion. This is done in the form of images and/or texts. The punctiform light sources are, in particular:

In a light emitting diode or LED, charge carriers in a pn junction operated in the conducting direction can assume high energy values which they re-emit in the form of light quanta. The generated light is virtually monochromatic and depends on the semiconductor material and the doping thereof. LED's, made for example from GaP, GaAs or GaAsP, emit discrete wavelengths in the red, green, and yellow spectral range (660 to 550 nm).

The light of a single lamp can be passed to the luminous field by glass fibre technology. In the case of red-yellow-green signalling, three glass fibres are required per raster point. In general, to generate a rasterized luminous field, LED technology is preferred: it is less delicate, has a longer service life with regard to the light source, and requires less energy and maintenance than glass fibre technology.

DE, A1 2702823 disclosed for the first time an electrically illuminated signalling device which has an luminous field with a multiplicity of LEDs and a translucent or transparent cover. Each LED is assigned a spherically constructed cap of a lens extending over the entire luminous field. This solution gives high-intensity traffic signals which permit housings of substantially less depth. However, visors are still required if no or reduced visibility is desired or necessary in certain directions.

The aim of EP, A2 0694894 is a light intensity distribution adapted to the conditions without the need for complex and expensive lens systems. This is achieved by holding at least some of the LEDs inside the signalling lamp such that they can be tilted from a first to at least a second emission direction and positioned by an adjustment device. The desired emission direction is reached by means of rectilinear or rotating mechanical displacement elements. Thus it is possible to achieve a light intensity distribution largely corresponding to the requirements of the traffic participants. However, mechanically moving parts are required, a fact which is usually expensive or even disadvantageous in the medium and long term.

WO, A 96/24802 discloses prismatic toroidal lenses and a traffic signal with a luminous field composed of LEDs. Each LED contains a lens with a parabolic light-refracting surface and an outer light-refracting surface. The outer surface has an annular outer region and a central region. A specific spatially defined light intensity distribution is achieved with this special design of the lenses assigned individually to each LED. The aim of a spatially defined light intensity distribution is achieved in a relatively complicated manner with this honeycomb-shaped arrangement of a matrix of numerous, relatively complex lenses.

WO, A 97/26483 shows a lamp arrangement comprising a lens which can deflect the light in a desirable direction in order to comply with certain traffic regulations. This lens works in combination with special LEDs so that light emitted by it can be deflected. The structure of parallel grooves arranged at regular intervals in the inner area of the diffusion lens is striking. The area between the grooves is divided into two part areas. A first part area is designed flat or curved, a second part area has fluting running in the transverse direction of the grooves.

The inventors have set themselves the task of creating a device of the type stated initially and a process which meets the requirements of all observers in relation to the spatial light intensity distribution in a simple, optimum way without the need for delicate mechanisms or complex arrangements of special individual lenses. Furthermore, it should fulfil the latent need for continuous monitoring of the light intensity in particular of an ageing optical signalling or display device in order to be able to intervene immediately a critical threshold is passed.

With reference to the device, the task is solved according to the invention in that the circuit board is formed at least partly transparent and the flat area between the grooves of the diffusion lens runs parallel or at a slight angle to the outer flat surface. Special forms and developments of the device are the subject of the dependent claims.

A luminous field of a traffic signal is for example round and preferably has SMT or chip-on-board LEDs. The diameter of a luminous field is suitably approximately 200 mm but for larger signals can also be approximately 300 mm and have a correspondingly larger number of LEDs. Triangular and square luminous fields for example are dimensioned correspondingly.

The LEDs are arranged in the known manner on a printed circuit board. Each LED can emit white light or light of a particular colour. Also an LED of multipartite construction can also emit more than one colour, for example red and yellow, red and green or yellow and green. Tripartite LEDs can emit all three colours, for example red, yellow and green, which are required for traffic control signals.

In almost all optical signalling or display devices, it is desirable for the light intensity distribution to be optimised in energy terms and suitable for users. In particular with traffic signals, light beams emitted upwards and sharply to the side have practically no use or even a disruptive effect. The light beams are focused horizontally or downwards, whereby a substantially higher light intensity is achieved for the same energy consumption. An optimum light intensity distribution in percentage for luminous field diameters of 200 and 300 mm is standardized in DIN 67527 part 1. Above a vertical angle of +3° and below −10°, the light intensity is very low, as is the case for lateral angles greater than ±20°. Without screening visors, the car driver sees a traffic signal at an optimum distance with increased light intensity, but on a side road or from a dwelling situated next to the road, the signal on the main road is scarcely noticed.

All lenses, because of the good machinability, consist in particular of a transparent plastic or plexiglas. Lenses made from conventional glass or ceramic can certainly fulfil the purpose of the invention, but they are substantially more difficult to machine, and therefore more expensive.

Particularly in the case of the LEDs which emit white light, the lenses can be homogeneous or coloured in sectors and thus filter out a portion of the white light, whereby the original white light appears coloured. In the case of LEDs which emit coloured light and/or a plurality of lenses, it is also possible to form entire colour combinations.

The diffusion lens is mounted with the smooth side facing outwards, i.e. pointing away from the LEDs. This facilitates cleaning work in the event of dust or dirt. Moreover, the diffusion lens can also function thus as a cover plate but this should not prevent the additional use of such a cover plate if required. The internal parallel grooves extend over the entire diffusion lens, and at least up to an annular edge region. The grooves are constructed at least partially with a curved cross-section but also with a flat part area such that the light beams emitted by the LEDs are deflected in a light intensity distribution which largely corresponds to DIN 67527 part 1. The optimum geometry of the groove cross-section and the flat area connecting the grooves is established empirically by trial and calculation. One feature essential to the invention is the asymmetry, part of the light emitted by the LEDs is deflected and added to the non-deflected light. In this way a gain factor of up to 2 can be achieved. In this case, the diffusion lens is also termed a doubler lens.

According to an advantageous embodiment of the invention, it is possible to arrange an intermediate lens which collects the light emitted by the LEDs and feeds it to the outer diffusion lens. A broad emission characteristic can thus be achieved. When several lenses are used, the latter are preferably integrated on a common carrier.

As is already evident from the preceding statements, the main use of the optical signalling or display device is in rail or road traffic as a traffic signal or traffic light, to perform all signalling legally prescribed or decreed of:

orders such as red-yellow-green traffic routing, speed restrictions and overtaking bans, risks such as height restrictions under bridges and the risk of skidding, and information conveyed by stationary or moving images and/or alphanumeric texts such as displaying lane changes by moving arrows, advance warning of roadworks, tunnels, icing or wind gusts, by remote control to be clearly visible and relevant.

In addition to new fitments, the optical signalling and display devices according to the invention can also be used for conversion, where the low power consumption of 8 to 12 W can be achieved by interposing an ohmic consumer. With this low power consumption for example, a light intensity of approximately 500 cd can be achieved by using a light distribution in accordance with DIN 67527 part 1. The usual service life for LEDs of more than 10 years can be achieved with no further measures.

The device according to the invention can however be used not only in traffic but also on and in buildings, in particular public buildings, on lifts and escalators, on ski lifts etc. as a display device.

With reference to the process for monitoring the light intensity of an optical signalling or display device with a rasterized luminous field, the task according to the invention is solved in that sensors arranged on the rear of a printed circuit board detect light beams emitted rearwards by light sources arranged on the at least partially transparent circuit board, and/or light beams which are reflected at the light-collecting intermediate lens or, if this is not used, at the diffusion lens and pass through the circuit board, and convert these into signals which are passed to an electronic system which, when a defined threshold is passed, initiates action in the form of increased electrical power, advance warning and/or disconnection.

Various causes can reduce the light intensity of an optical signalling or display device, for example age or coating of the transparent outer lens or cover glass with dust and/or dirt. In order to guarantee the user a constantly unambiguous operating state, the light intensity is monitored optically according to the invention where the light intensity emitted by LEDs is detected in the housing, also termed the sealing cover, of the optical signalling and display device by sensors arranged therein, and converted into preferably electric signals. A microprocessor compares the signals with pre-scribed nominal values.

Measures are instituted for example by the electronic system, for example a microprocessor, arranged inside or outside the optical signalling and display device when the value falls by a threshold value of for example at least around 30%, in particular in the range from 40 to 60% of the nominal value. The electric power is reduced accordingly for example when it is no longer required at this level after cleaning of the signal. An advance warning can be given optically and/or acoustically in a control centre. If the fault is not rectified within a relatively short time, the system is shut down or, in the case of traffic lights, switched to a yellow flashing light. Simpler signalling systems can be shut down without advance warning or increase in electrical power when the threshold value is no longer reached.

The process according to the invention for monitoring the light intensity can be applied in all optical signalling or display devices having a rasterized luminous field by applying expert knowledge.

Figure 3:
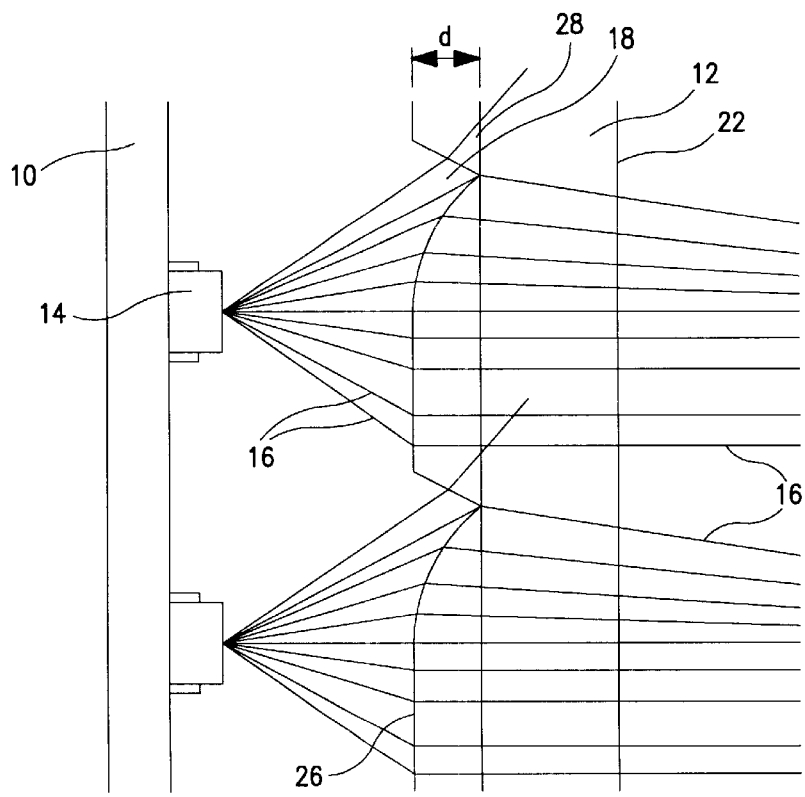
Figure 4:
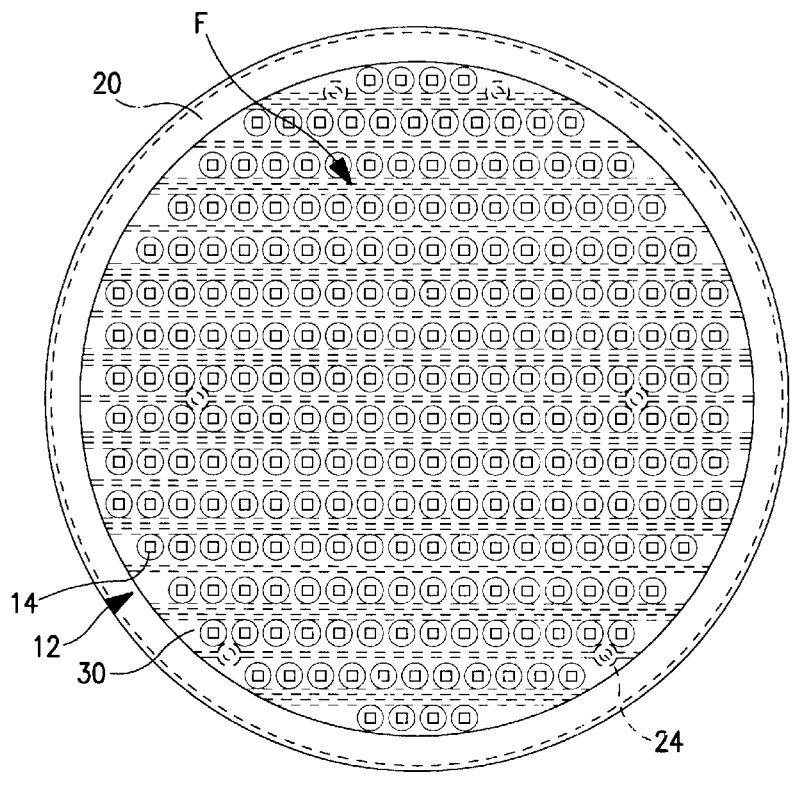
Figure 5:
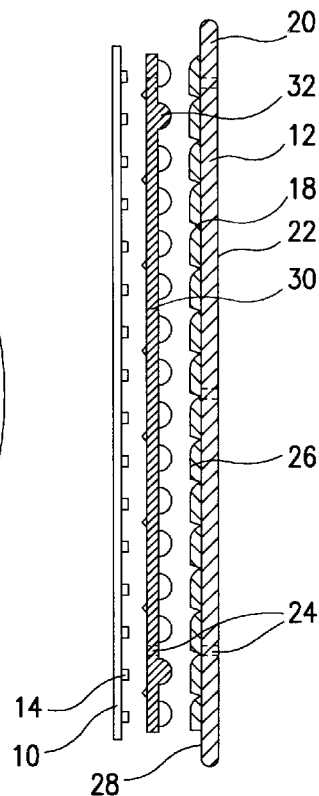
Figure 6:
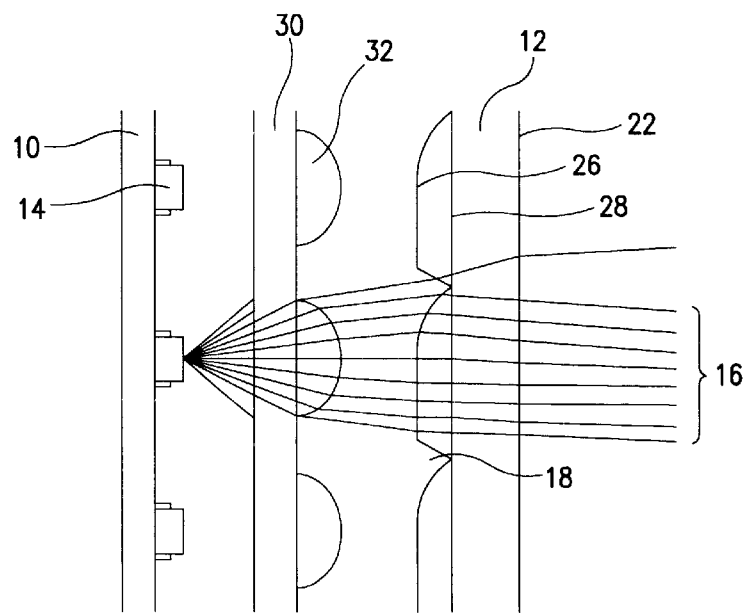
Figure 10:
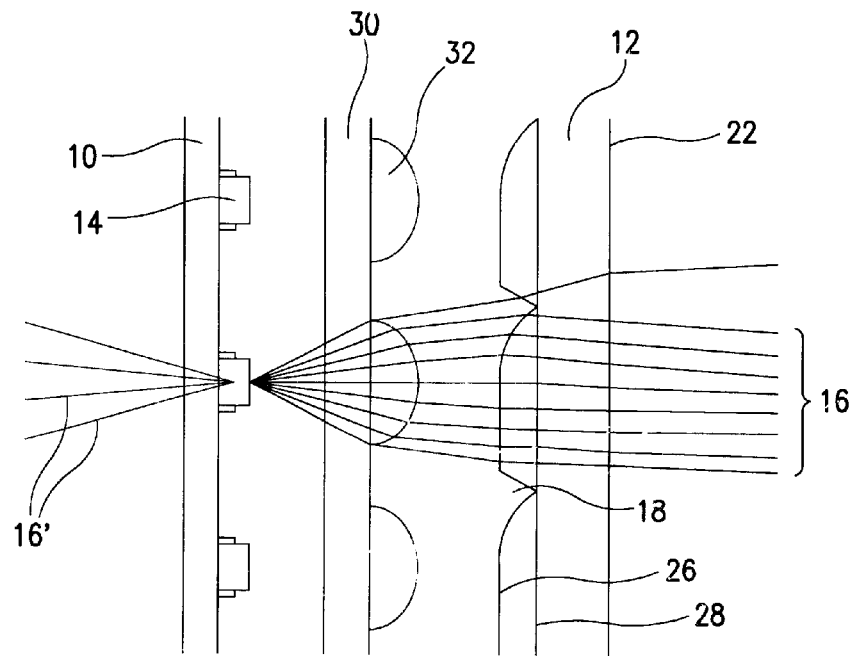
Figure 11:
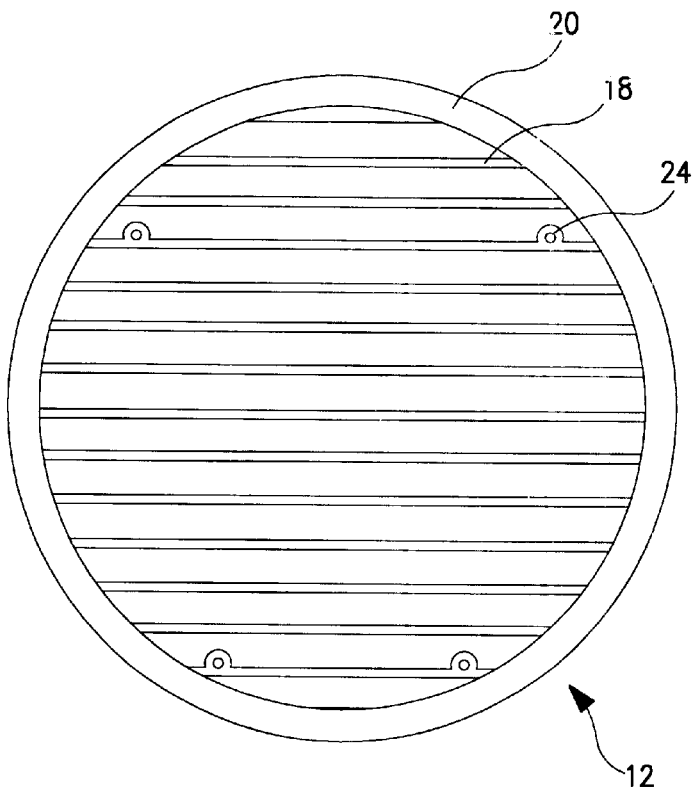
Figure 12:
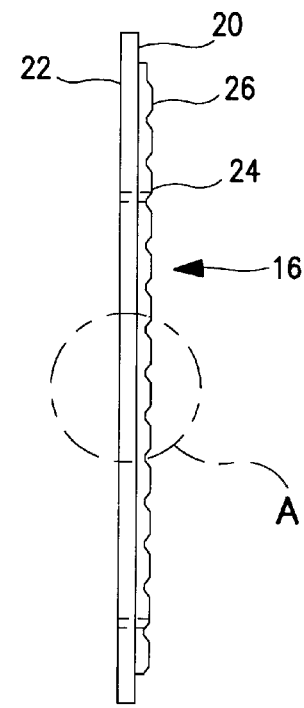
Figure 13:
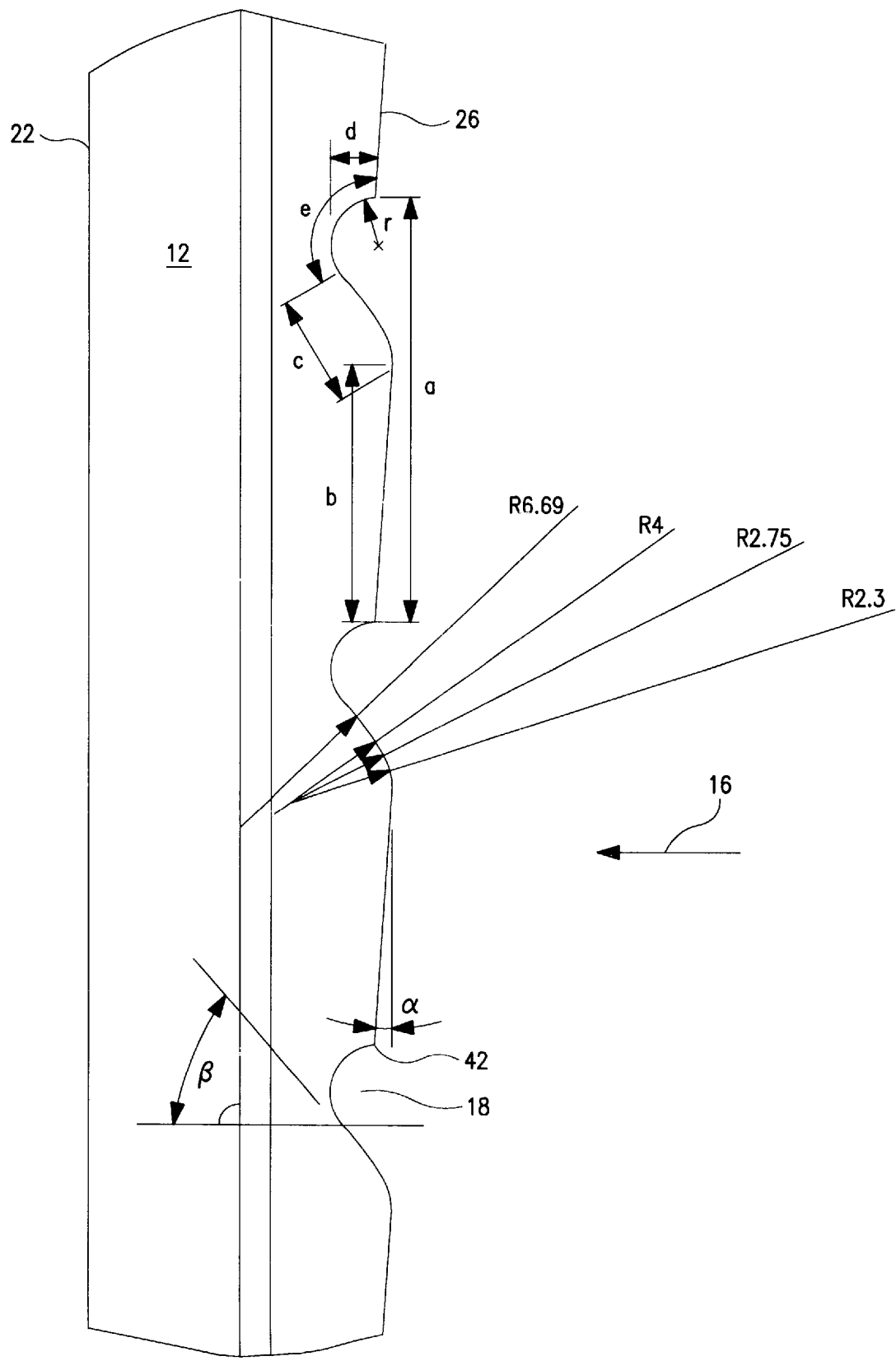

The invention is explained in more detail with the aid of design examples shown in the drawing which form the subject of the dependent claims. The drawings show diagrammatically:

FIG. 1 a view of a disc-shaped printed circuit board with inserted LEDs and a diffusion lens behind this, FIG. 2 a vertical diagonal cross-section of FIG. 1, FIG. 3 the beam path in an enlarged section of FIG. 1, FIG. 4 a view of an intermediate lens constructed as a collecting lens, FIG. 5 a vertical diagonal cross-section through an intermediate lens in accordance with FIG. 4, with printed circuit board and diffusion lens, FIG. 6 a beam path through an enlarged section in accordance with FIG. 4, FIG. 7 a beam path with reflected light, FIG. 8 the structure of a reflector comb in accordance with FIG. 7, FIG. 9 a traffic signal with an LED and lens arrangement, and an internally reflecting housing and sensors, FIG. 10 a beam path of an LED on a transparent printed circuit board, FIG. 11 an embodiment of the diffusion lens, FIG. 12 a vertical cross-section through a diffusion lens in accordance with FIG. 11, and FIG. 13 an enlarged detail with grooves in accordance with FIG. 12.

A single-lens concept shown in FIGS. 1 and 2 shows two adjacent parallel discs, a printed circuit board 10 and a diffusion lens 12. Arranged in a largely square raster on the printed circuit board 10 in the form of a matrix are 242 LEDs 14 which form a round luminous field F and in the direction of the diffusion lens emit light beams 16 (FIG. 3) with a limited angle of emission. The LEDs are suitably attached to the circuit board 10 using "surface mount technology" (SMT). The circuit board as such is constructed in a manner known to the expert.

The diffusion lens has at corresponding intervals in the raster for the LEDs 14 parallel grooves 18 which are formed in the direction of the LEDs 14. These grooves 18 terminate at a peripheral edge 20 of the diffusion lens 12. The diffusion lens 12 is also termed a doubler lens, because it preferably doubles the light intensity of the lower half of the optical signalling or display device. The surface 22 facing away from the LEDs 14 is flat and easy to clean.

The diffusion lens 12 is penetrated by six bolt holes 24 which serve to hold the lens by means of retaining bolts.

The beam path of the light beams 16 emitted by two LEDs 14 is shown in FIG. 3. The light beams 16 are refracted at the surface 26 facing the LEDs, or the inner surface, and then enter the diffusion lens 12.

In a description starting from the bottom, the inner surface 26 runs initially parallel at a distance d from the smooth surface 22 of the diffusion lens. It then runs curving inward to form a groove 18 into an acute angle on the virtual plane 28 formed by the peripheral edge 20. After the acute angle, the inner surface 26 runs flat until it again runs on the plane parallel to the surface 22 at a distance d of approximately 2 mm. The next groove 18 is formed with incipient curvature.

In the region of the curvature of the inner surface 26, the light beams 16 are refracted such that at a predetermined interval they are overlaid with the light beams 16 refracted by the flat part of the surface 26 running parallel to the surface 22, so that the luminous field F (FIG. 1) appears brighter in the lower half.

On the inner surface 26 (not shown), reflection combs 40 (FIGS. 7, 8) or similar can also be formed.

A parallel intermediate lens 30, a collecting lens, is arranged between the circuit board 10 and the diffusion lens 12 in the lens system according to FIGS. 4, 5. Spherical caps 32 are formed facing the diffusion lens 12. The centre of caps 32 lies on the central normal of the LEDs 14, in other words the spherical caps 32 have the same raster as the LEDs 14.

The bores 24 of the two lenses are arranged coaxially, the lens system can be fixed with a spacer bolt or a screw for each bore and spacers, the two lenses 12, 30 are integrated on a carrier.

The beam path of a lens system according to FIGS. 4, 5 is shown in FIG. 6. Each spherical cap 32 refracts the light beams 16 of the assigned LEDs 14 and relays the light beams 16 to the diffusion lens 12 where the effect according to FIG. 3 occurs. Therefore LEDs 14 with a broad emission characteristic can also be used.

With regard to the main beam path, FIG. 7 corresponds substantially to FIG. 6. Two substantial differences are recognised:

The printed circuit board 10 which is made from a carrier material which is opaque in the region of the LEDs 14, has perforated, i.e. transparent zones 34 which are formed as strips between LEDs 14. The opaque carrier material consists for example of a ceramic, the transparent material of plastic, plexiglas, glass or ceramic.

On the side of the intermediate lens 30 facing away from the spherical caps 32 are arranged reflection combs 36 which here run parallel to the caps 32. One, two or more reflection combs can be formed.

The light beams 16 deflected at the reflection combs 36 can pass through the transparent zones 34 of the printed circuit board 10 and as light beams 16" reach sensors 38 (FIG. 9) where they are detected and passed for evaluation. In accordance with variants not shown, instead of reflection combs 36 other reflection elements, known in themselves, can be used which reflect deflected light beams 16 through the printed circuit board 10.

FIG. 8 shows a variant of the structure of a reflection comb 36 on an intermediate lens 30, which has the shape of an obtuse-angled triangle with legs of equal length. The light beams 16 (FIG. 7) striking the surfaces of the legs would not be reflected but refracted. Therefore the reflection comb 36 is covered evenly with a reflecting layer 40 which prevents the penetration of the light beams 16. The layer 40 consists, for example of aluminium, chromium, silver or of another corrosion-resistant metal which does not tarnish in air.

A traffic signal shown in FIG. 9 has an LED and lens arrangement in accordance with FIG. 5. The diffusion lens 12 or its surface 22 acts simultaneously as a cover plate. A cover-like housing 42 preferably has a glossy inner layer 40 and acts simultaneously as a reflector for light beams 16' and 16" which are deflected or emitted rearwards. Integrated into the rear of the printed circuit board 10 are preferably two to four sensors 38 which detect light beams 16' and 16" deflected or emitted rearwards, and convert these into electrical pulses which are passed for evaluation to a microprocessor (not shown). Such a microprocessor can be arranged inside or outside the housing 42.

The lens system shown in FIG. 10 also corresponds substantially to FIG. 6. The printed circuit board 10 is however formed completely transparent and consists of a plastic. The LED 14 also emits rearwards light beams 16' which penetrate the transparent circuit board and are detected by sensors in accordance with FIG. 9.

According to a variant which is not shown but is self-evident, reflection combs 36 shown in FIG. 8 can also be provided on the intermediate lens 30 according to FIG. 10, which thanks to the metallic coating 40 reflect a small portion of the light beams 16 through the transparent printed circuit board 10.

FIGS. 11 and 12 show a circular diffusion lens 12 with a diameter of 200 mm. The direction of view is identical to the direction of passage of the light beams 16 (FIG. 10). The parallel grooves 18 terminate in the peripheral edge 20. Four bolt holes 24 penetrate the diffusion lens 12. The area A circled with a dotted line in FIG. 12 is shown enlarged in FIG. 13.

The shape of the inner surface 26 is of great importance in FIG. 13. Grooves 18 with a depth d of preferably 1 to 3 mm are arranged at intervals a, preferably 10 to 15 mm. In detail, the inner surface 26 of the diffusion lens 18 has the following shape:

The surface 26 is flat in the area b between the grooves 18, and runs slightly angled away from the outer surface 22, preferably at an angle $\alpha$ up to approximately 10°, in particular 3 to 6°. The angle $\alpha$ is approximately 4° according to FIG. 13.

With reference to the mounted diffusion lens 12, starting from below, the inner surface 26 is gradually transformed after the flat area b into an area c with a progressively increasing radius of curvature R. With the geometric conditions of FIG. 13, with a thickness of the diffusion lens 12 of approximately 9 mm, a groove depth d of around 2 mm and a groove spacing of around 13 mm, the area c of progressive increase in radius of curvature R is approximately 5 mm long. The radius of curvature R increases on this length from 2.3 mm by way of 2.75 mm and 4 mm to 6.69 mm. The region c terminates when the tangential angle $\beta$ has reached a prescribed value of preferably 40 to 50°, in the present case approximately 45°.

After the area c, the inner surface 26 is transformed, also gradually, into an area e in the shape of a cylinder casing, which has a radius r of preferably approximately 1 to 3 mm, in the present case approximately 1.5 mm.

The cylinder casing-shaped area e intersects the next flat area b at an obtuse angle. The intersection line 42 is suitably chamfered or rounded.

What is claimed is:

1. Process for monitoring the light intensity of an optical signaling or display device which has a plurality of light sources arranged on the front of a printed circuit board in a rasterized luminous field (F) and a diffusion lens arranged in the main light emission direction of the light sources or a light-collecting intermediate lens and a diffusion lens arranged in sequence, characterized by the process steps: use of an at least partly transparent printed circuit board for arrangement of the light sources; arrangement of sensors to detect light on the rear of the circuit board; detection of the light beams emitted rearwards towards the printed circuit board by the light sources and/or detection of the light beams reflected at the intermediate lens or, if this is omitted, at the diffusion lens and passing through the printed circuit board; conversion of the detected light beams into signals which are passed to an electronic system; initiating an action which increases the electrical power, advance warning and/or disconnection by the electronics system when the signal values fall by a predefined threshold value.

2. Process according to claim 1, characterized in that the threshold value for initiating an action is at least approximately 30% of the prescribed nominal value.

3. Optical signaling or display device for performance of the process according to claim 1, which device has a housing, a rasterized luminous field (F) arranged on a printed circuit board with light sources which can be controlled individually, in groups or as a whole, and a diffusion lens, which is flat on the outside and extends over the entire luminous field, on the inside of which are formed parallel grooves with an at least partly asymmetrically curved surface, characterized in that sensors are arranged on the rear of the at least partly transparent printed circuit board to detect light, and an electronic system to initiate an action when the value falls below a preset threshold value of the converted detected light beams, where the area (b) between the grooves of the diffusion lens is formed flat and runs parallel to or angled slightly at an angle ($\alpha$) to the outer flat surface.

4. Device according to claim 3, characterized in that the flat area (b) is angled at an angle ($\alpha$) of up to approximately 10°.

5. Device according to claim 3, characterized in that the flat area (b) in the grooves is initially transformed gradually into an area (c) with progressively increasing radius of curvature (R), and after reaching a tangential angle ($\beta$) in the region of 40 to 50°, is transformed gradually into an area (e) of cylinder casing shape which intersects the next flat area (b).

6. Device according to claim 5, characterized in that the radius of curvature (R) in the area (c) of the grooves increases progressively from approximately 2 to approximately 10 mm, preferably from approximately 2.5 to approximately 7 mm, and the constant radius (r) in the cylinder casing-shaped area (e) of the grooves is 1 to 3 mm, preferably approximately 1.5 mm, the depth (d) of the grooves is in the range from 1 to 3 mm, and their spacing (a) is in the range from 10 to 15 mm.

7. Device according to claim 3, characterized in that an internally flat intermediate lens, fitted on the outside with spherical caps, is arranged between the printed circuit board and the diffusion lens, whereby the matrix of light sources corresponds precisely to that of the caps, and all lenses are preferably integrated on a carrier.

8. Device according to claim 7, characterized in that the printed circuit board and the intermediate lens have areas which are silvered facing the light source and are preferably angled, which areas reflect a portion of the emitted light beams, where these regions are preferably constructed in the form of one or more parallel reflection combs.

9. Device according to claim 3, characterized in that the inside of the housing has sensors.

10. Device according to claim 3, characterized in that the inside of the housing is constructed as a light reflector.

11. Process according to claim 1, characterized in that the threshold value for initiating an action is in the range from 40 to 60% of the prescribed nominal value.

12. Device according to claim 3, characterized in that the flat area (b) is angled at an angle ($\alpha$) of from 3 to 6°.

* * * * *